(12) United States Patent
Kanamori et al.

(10) Patent No.: US 12,343,627 B2
(45) Date of Patent: Jul. 1, 2025

(54) INFORMATION PROCESSING PROGRAM, INFORMATION PROCESSING METHOD, INFORMATION PROCESSING DEVICE, AND INFORMATION PROCESSING SYSTEM

(71) Applicant: CYGAMES, INC., Tokyo (JP)

(72) Inventors: Saera Kanamori, Tokyo (JP); Kengo Moritsuki, Tokyo (JP)

(73) Assignee: CYGAMES, INC., Tokyo (JP)

(*) Notice: Subject to any disclaimer, the term of this patent is extended or adjusted under 35 U.S.C. 154(b) by 302 days.

(21) Appl. No.: 17/466,660

(22) Filed: Sep. 3, 2021

(65) Prior Publication Data

US 2021/0394064 A1 Dec. 23, 2021

Related U.S. Application Data

(63) Continuation of application No. PCT/JP2020/008329, filed on Feb. 28, 2020.

(30) Foreign Application Priority Data

Mar. 7, 2019 (JP) .................. 2019-041144

(51) Int. Cl.
*A63F 13/533* (2014.01)
*A63F 13/2145* (2014.01)
(Continued)

(52) U.S. Cl.
CPC ........ *A63F 13/533* (2014.09); *A63F 13/2145* (2014.09); *G06F 3/04842* (2013.01); *G06F 3/04883* (2013.01)

(58) Field of Classification Search
None
See application file for complete search history.

(56) References Cited

U.S. PATENT DOCUMENTS 6,259,431 B1 * 7/2001 Futatsugi ............ G06F 3/04815
345/157
6,533,663 B1 * 3/2003 Iwao ..................... A63F 13/45
463/31
(Continued)

FOREIGN PATENT DOCUMENTS

| CN | 105148520 A | 12/2015 |
| CN | 106959812 A | 7/2017 |

(Continued)

OTHER PUBLICATIONS

Complete Guide on How to Play Ark Mobile! Ark Strategy wiki, [online], Dec. 3, 2018 [retrieved: May 17, 2019], Internet: <URL: https://70okugame.com/ark.
(Continued)

*Primary Examiner* — Seng H Lim
(74) *Attorney, Agent, or Firm* — Osha Bergman Watanabe & Burton LLP

(57) ABSTRACT

A player is provided with simper operations in a computer game in which a displayed region is movable. An information processing program realizes, with a computer: a disposing function for disposing a first object and a second object in a virtual space; a display control function for causing a display medium to display a prescribed region of the virtual space; a region moving function for moving the prescribed region on the basis of the input of a continuous movement instructing operation by a player; a selecting function for selecting the first object in the case where the first object is displayed at a prescribed position in the prescribed region while the movement instructing operation is being continued; and an action executing function for causing the second object to execute an action executable on the first object that was selected while the movement (Continued)

instructing operation was being continued in the case where the movement instructing operation has been finished.

12 Claims, 8 Drawing Sheets

(51) Int. Cl.
  *G06F 3/04842* (2022.01)
  *G06F 3/04883* (2022.01)

(56) References Cited

U.S. PATENT DOCUMENTS

| | | | | |
|---|---|---|---|---|
| 8,197,339 | B2* | 6/2012 | Maehiro | A63F 13/5372 463/31 |
| 2002/0034979 | A1* | 3/2002 | Yamamoto | A63F 13/45 463/31 |
| 2004/0176163 | A1* | 9/2004 | Ishihata | A63F 13/10 463/30 |
| 2006/0223633 | A1* | 10/2006 | Hamamoto | A63F 13/10 463/30 |
| 2006/0246968 | A1* | 11/2006 | Dyke-Wells | A63F 13/837 463/2 |
| 2007/0155501 | A1* | 7/2007 | Kanemori | A63F 13/45 463/37 |
| 2008/0227543 | A1* | 9/2008 | Kawase | A63F 13/10 463/31 |
| 2009/0270182 | A1* | 10/2009 | Kudo | A63F 13/833 463/43 |
| 2010/0279770 | A1 | 11/2010 | Ikeda | |
| 2012/0309480 | A1* | 12/2012 | Kashitani | A63F 13/822 463/8 |
| 2013/0288790 | A1* | 10/2013 | Wang | A63F 13/2145 463/31 |
| 2014/0066195 | A1* | 3/2014 | Matsui | A63F 13/42 463/30 |
| 2014/0225893 | A1* | 8/2014 | Bowles | G06T 15/20 345/427 |
| 2014/0357356 | A1* | 12/2014 | Horie | A63F 13/2145 463/31 |
| 2015/0030305 | A1* | 1/2015 | Moon | A63F 13/211 386/230 |
| 2016/0250554 | A1* | 9/2016 | Haigh-Hutchinson | A63F 13/837 463/32 |
| 2016/0263479 | A1* | 9/2016 | Yamagami | A63F 13/00 |
| 2017/0221269 | A1* | 8/2017 | Inomata | G06F 3/017 |
| 2018/0001189 | A1* | 1/2018 | Tang | G06F 3/04842 |
| 2018/0033158 | A1* | 2/2018 | Campbell | G06F 3/0488 |
| 2018/0311579 | A1* | 11/2018 | Matsui | A63F 13/42 |
| 2018/0345147 | A1* | 12/2018 | Okajima | A63F 13/332 |
| 2019/0091561 | A1* | 3/2019 | Li | A63F 13/537 |
| 2019/0118078 | A1* | 4/2019 | Li | A63F 13/2145 |
| 2019/0366214 | A1 | 12/2019 | Pan | |
| 2021/0064207 | A1* | 3/2021 | Kim | G06F 3/0412 |
| 2021/0299562 | A1* | 9/2021 | Zhou | A63F 13/5378 |

FOREIGN PATENT DOCUMENTS

| | | |
|---|---|---|
| CN | 107362535 A | 11/2017 |
| CN | 108310764 A | 7/2018 |
| CN | 108355354 A | 8/2018 |
| JP | 2002-373350 A | 12/2002 |
| JP | 2014-045965 A | 3/2014 |
| JP | 5485702 B2 | 5/2014 |

OTHER PUBLICATIONS

What Is the Difference Between the Popular Survival Action Game "Ark: Survival Evolved" and the Smartphone Version "Ark mobile"? Gameplay Videos Released Too! FamitsuApp, [online], Apr. 4, 2018 [retrieved: May 17, 2019], Internet :<URL:https://app.famitsu.com/20180404_1271567/>.
Tristar/Ushizawa, Youji. Cuteness is Justice! "(Hobo) Nikkan Sports Game Tsushin" No. 442 Introduces "Maho Shojo LockOn!", the iOS Shooting Game for Collecting Magical Girls.),4Gamer.net [online], Jan. 11, 2014 [retrieved: May 17, 2019], Internet: <URL:https://www.4gamer.net/games/244/G024460/20140110103/>.
"Attack without Tapping"—That's How You Do Fluid Combos: A Review of "Sangoku Bassa", the Hack-and-Slash Action Game that can be Played Comfortably on a Vertical Smartphone Screen, meeti, [online], May 23, 2018 [retrieved: May 17, 2019], Internet: <URL: http://i.meet-i.com/?p=223518>.
[PUBG Mobile] Recommended Optimal Settings! What Operation Settings Will Get You a Thumping Victory?, GameWith [online], Jul. 17, 2018 [retrieved: May 17, 2019]? Internet: <URL: https://gamewith.jp/pubg/article/show/93370>.
The Legend of Zelda: The Wind Waker, for GameCube. V Jump Books: Game Series. First Edition, Shueisha Inc., Jan. 29, 2003, pp. 13, 18, 60, 74.
International Search Report issued in PCT/JP2020/008329 on Apr. 14, 2020 (4 pages).
Written Opinion of the International Searching Authority issued in PCT/JP2020/008329 on Apr. 14, 2020 (4 pages).
Office Action issued in the counterpart Chinese Patent Application No. 202080019217.0, mailed on Dec. 4, 2023 (23 pages).
Office Action issued in Chinese Application No. 202080019217.0, mailed Sep. 10, 2024 (17 pages).

\* cited by examiner

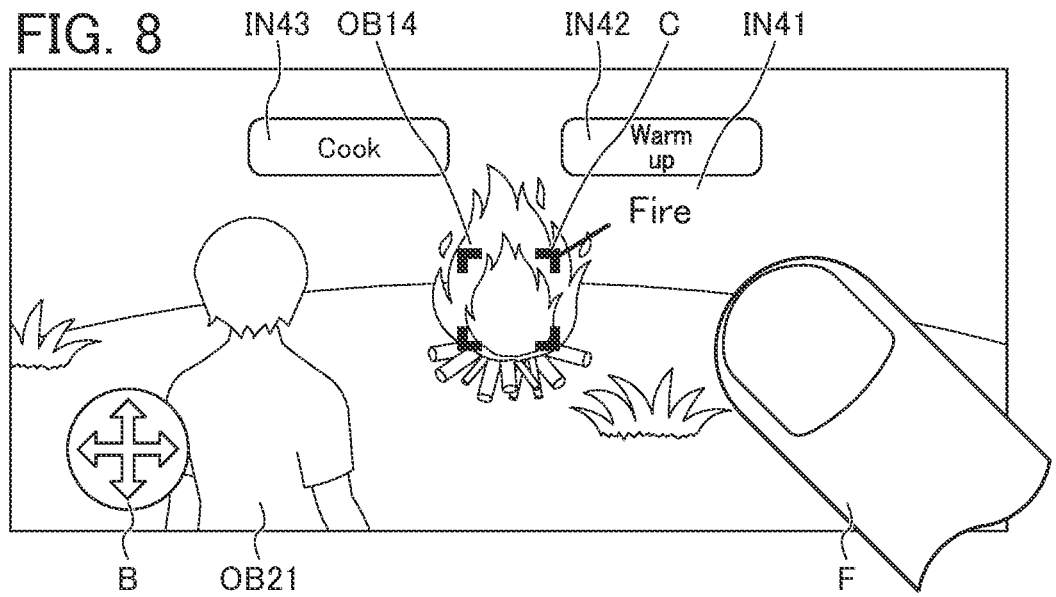
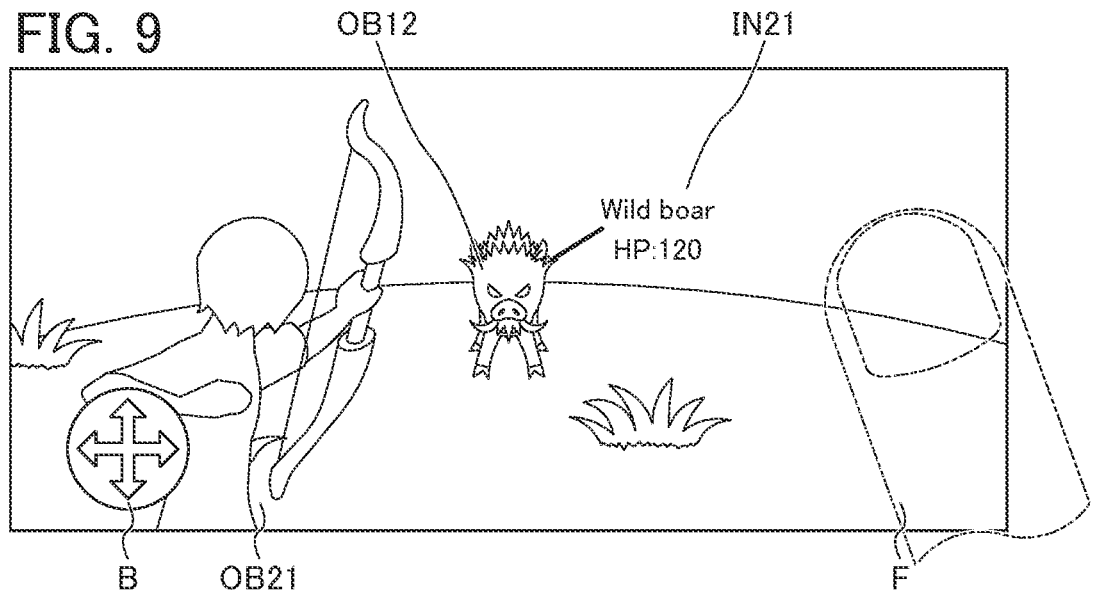

US 12,343,627 B2

INFORMATION PROCESSING PROGRAM, INFORMATION PROCESSING METHOD, INFORMATION PROCESSING DEVICE, AND INFORMATION PROCESSING SYSTEM

TECHNICAL FIELD

The present invention relates to information processing programs, information processing methods, information processing devices, and information processing systems.

BACKGROUND ART

In a computer game, a player performs various operations, and the game proceeds on the basis of the various operations. For example, the player performs various operations such as an operation for moving an operable object, an operation for selecting another object, and an operation for causing the operable object to execute an action.

Furthermore, in the case of a game in which display is performed in three dimensions (3D), it is generally the case that the player further performs an operation for moving a displayed region in order to move the displayed region (e.g., see Patent Literature 1).

By enabling various operations including such an operation for moving a displayed region in a game, it is possible to increase the variety of operations by the player, thereby further enhancing game intricacies.

[Patent Literature 1] Publication of Japanese Patent No. 5485702

DISCLOSURE OF THE INVENTION

Problems to be Solved by the Invention

However, in the case where various operations, including an operation for moving a displayed region, are enabled, as described above, the player has to perform such various operations sequentially or concurrently. Thus, there has been an aspect that the player perceives the operations as being laborious.

The present invention has been made in view of the situation described above, and it is an object thereof to provide a player with simpler operations in a computer game in which a displayed region is movable.

Means for Solving the Problems

In order to achieve the above object, an information processing program according to an aspect of the present invention realizes, with a computer:

a disposing function for disposing a first object and a second object in a virtual space;
a display control function for causing a display medium to display a prescribed region of the virtual space;
a region moving function for moving the prescribed region on the basis of the input of a continuous movement instructing operation by a player;
a selecting function for selecting the first object in the case where the first object is displayed at a prescribed position in the prescribed region while the movement instructing operation is being continued; and
an action executing function for causing the second object to execute an action executable on the first object that was selected while the movement instructing operation was being continued in the case where the movement instructing operation has been finished.

Effects of the Invention

The present invention makes it possible to provide a player with simper operations in a computer game in which a displayed region is movable.

BRIEF DESCRIPTION OF THE DRAWINGS

FIG. 8 is a schematic illustration showing another example of presentation of object information, etc. as an example of presentation in the composite-operation realizing process.

FIG. 9 is a schematic illustration showing an example of presentation of another action by the second object, etc. as an example of presentation in the composite-operation realizing process.

PREFERRED MODE FOR CARRYING OUT THE INVENTION

An embodiment of the present invention will be described below with reference to the drawings.

Overview of the Embodiment

It is an object of this embodiment to provide a player with simpler operations in a computer game in which a displayed region is movable.

For this purpose, in this embodiment, first objects (e.g., characters other than a character that is operable by the player) and a second object (e.g., a character that is operable by the player) are disposed in a virtual space (e.g., a 3D space in which the computer game proceeds). Furthermore, in this embodiment, a prescribed region of the virtual space is displayed on a display medium (e.g., a touchscreen).

Furthermore, in this embodiment, the prescribed region is moved on the basis of the input of a continuous movement instruction operation by the player (e.g., a swipe operation by the player). Furthermore, in this embodiment, a first object is selected in the case where the first object is displayed at a prescribed position in the prescribed region while the movement instruction operation is being continued. Furthermore, in this embodiment, in the case where the movement instructing operation has been finished, the second object is caused to execute an action executable on the first object that was selected while the movement instructing operation was being continued.

According to this embodiment, configured as described above, it is possible to realize a plurality of processing steps with just a single operation, namely, a movement instructing operation, whereas a plurality of processing steps have conventionally been realized with a combination of a plurality of operations.

Specifically, with just a single operation, namely, a movement instructing operation, it is possible to realize a plurality of processing steps, such as (1) an operation for moving a prescribed region that is displayed (which has conventionally been realized with a swipe operation); (2) an operation for selecting a first object relating to the execution of an action (which has conventionally been realized with a tap operation); and (3) an operation for instructing the second object to execute an action (which has conventionally been realized with a separate tap operation), which have conventionally been realized with a combination of three operations, such as a swipe operation and a plurality of tap operations.

Furthermore, with this embodiment, which enables the operation method described above, it is possible to solve the problem that the player perceives operations as being laborious when performing various operations sequentially or concurrently as is conventionally the case.

That is, this embodiment makes it possible to provide a player with simpler operations in a computer game in which a displayed region is movable.

[Hardware Configuration]

Figure 1:
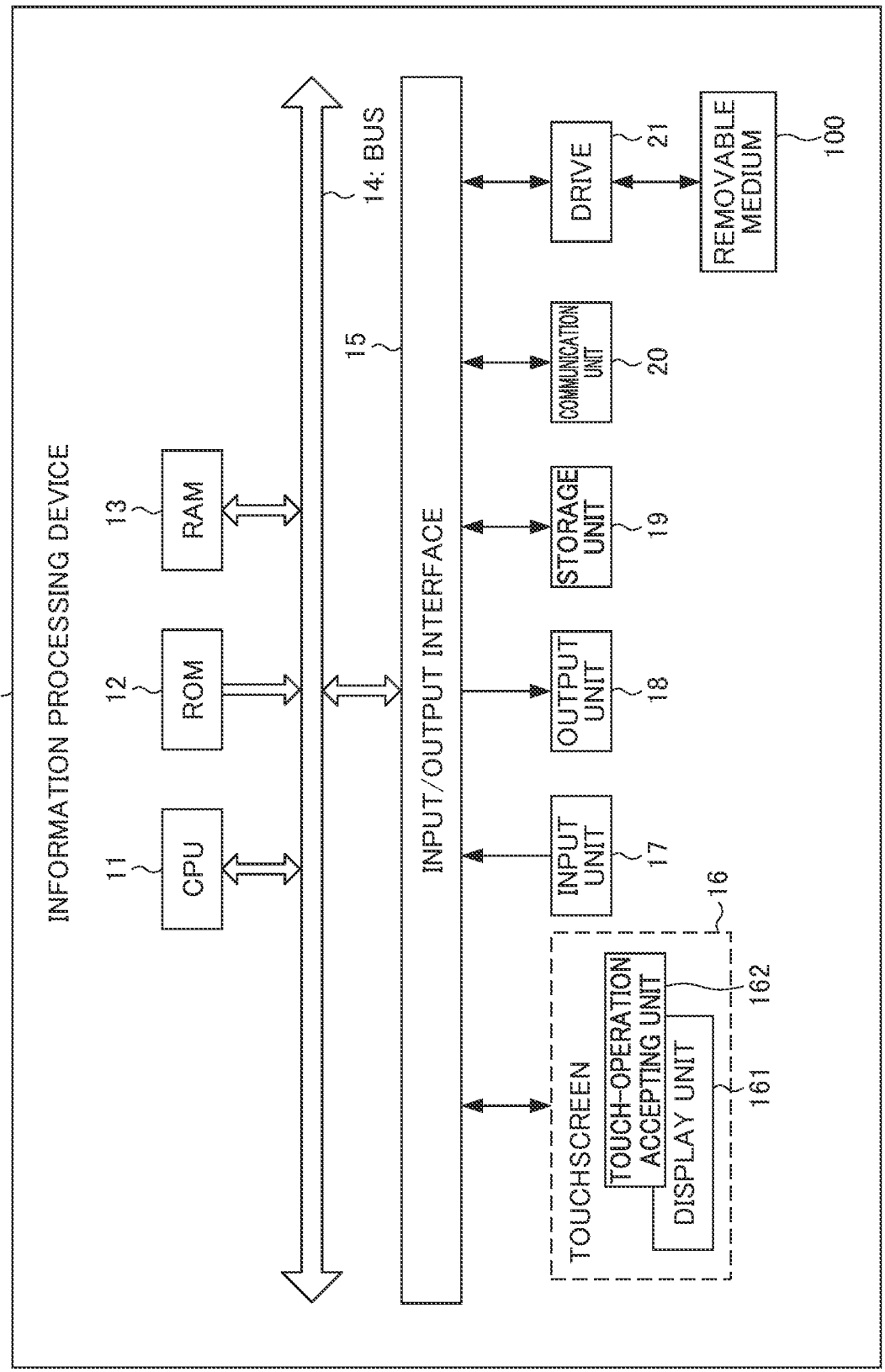
FIG. 1 is a block diagram showing the hardware configuration of an information processing device according to an embodiment of the present invention.

Next, the hardware configuration of this embodiment will be described with reference to FIG. 1. FIG. 1 is a block diagram showing the hardware configuration of an information processing device 1 according to the embodiment of the present invention.

As shown in FIG. 1, the information processing device 1 includes a central processing unit (CPU) 11, a read only memory (ROM) 12, a random access memory (RAM) 13, a bus 14, an input/output interface 15, a touchscreen 16, an input unit 17, an output unit 18, a storage unit 19, a communication unit 20, and a drive 21.

The CPU 11 executes various kinds of processing according to programs recorded in the ROM 12 or programs loaded from the storage unit 19 into the RAM 13.

The RAM 13 also stores, as appropriate, data, etc. needed for the execution of various kinds of processing by the CPU 11.

The CPU 11, the ROM 12, and the RAM 13 are connected to each other via the bus 14. The input/output interface 15 is also connected to the bus 14. The touchscreen 16, the input unit 17, the output unit 18, the storage unit 19, the communication unit 20, and the drive 21 are connected to the input/output interface 15.

The touchscreen 16 is constructed by stacking a touch-operation accepting unit 162 and a display unit 161.

The display unit 161 is formed of a liquid crystal or other type of display, and displays various kinds of images, such as images relating to a game, so that the player can recognize the images.

The touch-operation accepting unit 162 is formed of, for example, an electrostatic-capacity-based or resistive-film-based (pressure-sensitive) position input sensor that is stacked on the display unit 161, and detects the coordinates of a position where a touch operation has been performed. Here, the touch operation refers to an operation for bringing an object into contact with or into proximity to the touch-operation accepting unit 162. For example, the object that is brought into contact with or into proximity to the touch-operation accepting unit 162 is a player's finger, a stylus, or the like.

Examples of the touch operation include a tap operation, a swipe operation, and a flick operation. Note, however, that a swipe operation and a flick operation are both a series of operations with which the status changes from a state in which an object has begun to be brought into contact with or into proximity to the touchscreen 16 (hereinafter referred to as a "first swipe state"), through a state in which the position of the object is moved while maintaining the object in contact with or in proximity to the touchscreen 16 (hereinafter referred to as a "second swipe state"), to a state in which the object is brought out of contact with or out of proximity to the touchscreen 16 (hereinafter referred to as a "third swipe state"). Thus, in the following description, a series of movement operations that are performed continuously, as described above, will be collectively referred to as a "swipe operation". That is, a "swipe operation" in the following description is a broad concept encompassing the abovementioned flick operation, etc. as well as what is generally referred to as a swipe operation.

The input unit 17 is formed of various kinds of buttons, direction keys, a microphone, or the like, and accepts the input of various kinds of information in accordance with instructing operations performed by an administrator or the like of the information processing device 1. Alternatively, the input unit 17 may be realized by an input device, such as a game controller, a keyboard, or a mouse, that is independent of a main unit accommodating the other units of the information processing device 1.

The output unit 18 outputs sound data to a speaker (not shown) connected thereto. The speaker outputs the sound data output from the output unit 18 in forms recognizable by the player, such as music, sound effects, and voice.

The storage unit 19 is formed of a semiconductor memory, such as a dynamic random access memory (DRAM), and stores various kinds of data.

The communication unit 20 realizes communication that is carried out with other devices. For example, the communication unit 20 carries out communication mutually with a server device (not shown) from which a program for executing a game is downloaded, as well as other information processing devices 1 (not shown). This communication is carried out, for example, via a network such as a local area network (LAN), the Internet, or a mobile phone network, or a network formed by combining these kinds of networks. Furthermore, this communication may be carried out via a relaying device or directly between devices without any intervening relaying device. Note, however, that in this embodiment, the communication unit 20 is not a necessary component and may be omitted from the hardware.

The drive 21 is provided as needed and as appropriate. A removable medium 100 formed of a magnetic disk, an optical disk, a magneto-optical disk, a semiconductor memory, or the like is loaded, as appropriate, in the drive 21. The removable medium 100 stores a program for executing a game, as well as various kinds of data, such as image data. The program and the various kinds of data, such as image data, read by the drive 21 from the removable medium 100, are installed in the storage unit 19, as needed.

The information processing device 1 having such a hardware configuration can be realized by an electronic instrument having an information processing function, such as a smartphone or a portable game machine.

[Functional Configuration]

Next, the functional configuration of the information processing device 1 will be described with reference to FIG. 2.

Figure 2:
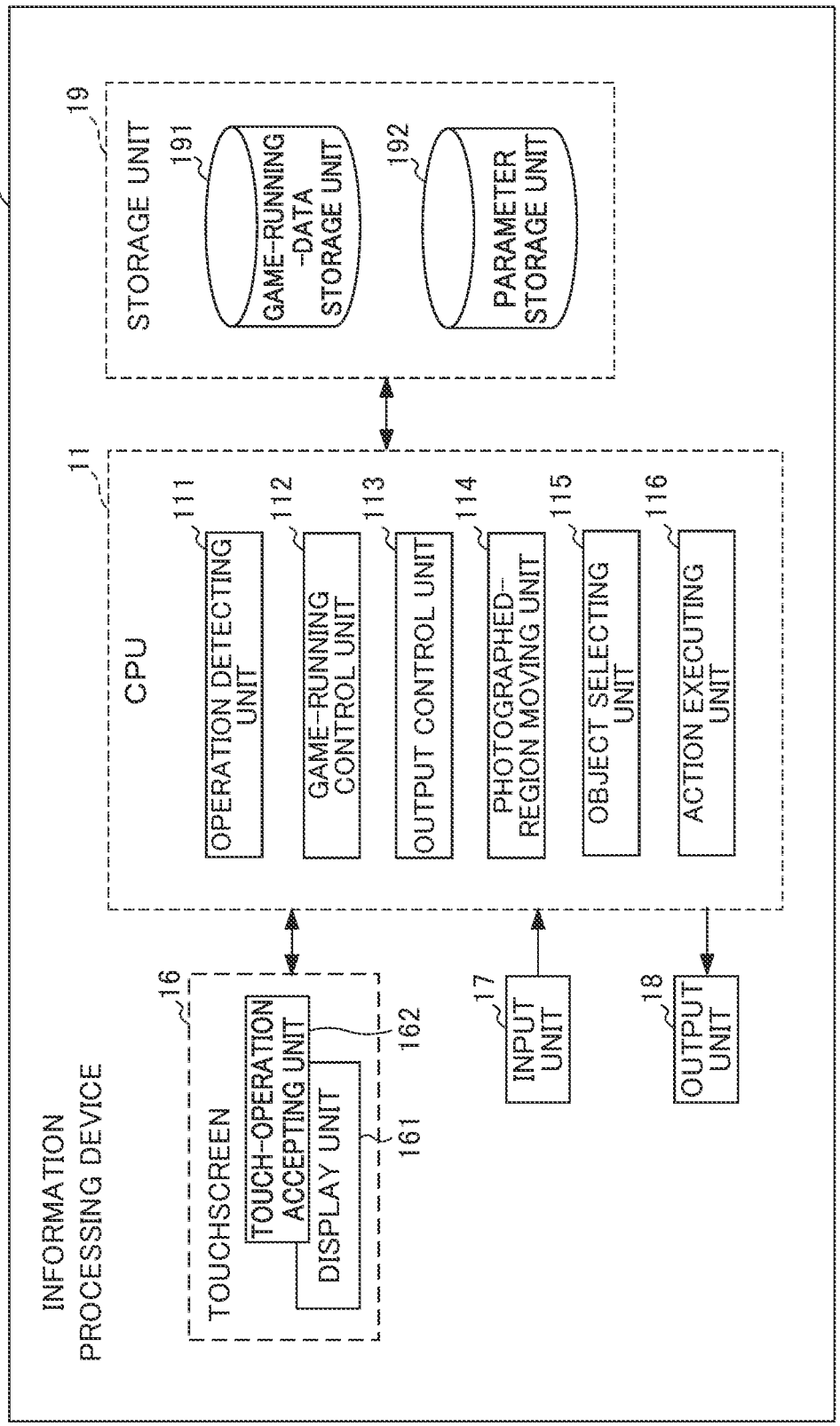
FIG. 2 is a functional block diagram showing the functional configuration for executing a composite-operation realizing process in the functional configuration of the information processing device shown in FIG. 1.

FIG. 2 is a functional block diagram showing the functional configuration for executing a composite-operation realizing process in the functional configuration of the information processing device 1 shown in FIG. 1.

Here, the composite-operation realizing process refers to a series of processing steps through which a plurality of processing steps corresponding to a plurality of operations are executed with a single operation by handling a continuous movement instructing operation by the player (e.g., a swipe operation by the player, as mentioned earlier), which is a single operation, as a combined operation (hereinafter referred to as a "composite operation").

In the case where the composite-operation realizing process is executed, the CPU 11 functions as an operation detecting unit 111, a game-running control unit 112, an output control unit 113, a photographed-region moving unit 114, an object selecting unit 115, and an action executing unit 116, as shown in FIG. 2. These functional blocks execute, as needed and as appropriate, computational processing needed for the execution of the composite-operation realizing process and information exchange among the functional blocks, as well as the processing described below.

Furthermore, a game-running-data storage unit 191 and a parameter storage unit 192 are set in an area of the storage unit 19.

The operation detecting unit 111 detects the input of an operation from the player, accepted via the touchscreen 16 or input unit 17. Furthermore, the operation detecting unit 111 determines the content of the detected operation input by the player. For example, in the case where the input of an operation from the player has been accepted via the touchscreen 16, the operation detecting unit 111 determines at which coordinates on the touchscreen the operation has been accepted. In this case, the operation detecting unit 111 determines the content of the operation on the basis of a change or the like at the coordinates where the operation has been accepted.

Furthermore, for example, in the case where the input of an operation from the player has been accepted via a controller implementing the input unit 17, the operation detecting unit 111 determines with which button or direction key the operation has been accepted. In this case, the operation detecting unit 111 determines the content of the operation on the basis of the kind of button or direction key with which the operation has been accepted.

Then, the operation detecting unit 111 outputs, as appropriate, the content of the operation input by the player, identified by the determination, to other functional blocks.

The game-running control unit 112 controls how the game runs as a whole by executing processing for running the game. Specifically, the game-running control unit 112 controls how the game runs on the basis of game software stored in the game-running-data storage unit 191, which will be described later, and the content of the player operation input from the operation detecting unit 111. Furthermore, the game-running control unit 112 outputs, as appropriate, the status of progress of the game based on the game running control to other functional blocks.

Furthermore, the game-running control unit 112 manages prescribed parameters that change in the game as the game runs. Examples of the prescribed parameters include parameters indicating the values of the status of an ally character, which is an object operable by the player, such as a level and hit points, parameters indicating items and equipment available for the ally character, and parameters indicating past game results.

These prescribed parameters are stored in the parameter storage unit 192, which will be described later. Furthermore, in the case where processing involving changes in these prescribed parameters (e.g., processing involving increases or decreases in the parameter values or processing that results in changes of flags indicating parameter statuses) occurs in the game, the game-running control unit 112 changes the prescribed parameters on the basis of the results of the processing. For example, in the case where processing involving a successful normal attack on the ally character by an enemy character has occurred, the hit points of the ally character are decreased in accordance with the normal attack.

Furthermore, the game-running control unit 112 updates the prescribed parameters stored in the parameter storage unit 192 on the basis of the prescribed parameters after the changes. Furthermore, the game-running control unit 112 continues to run the game in accordance with the updated prescribed parameters.

It suffices for the game that is run by the game-running control unit 112 to be a game in which a plurality of objects appear, and there is no particular limitation to the content of the game. That is, this embodiment is applicable to arbitrary games without limitations concerning the game content, the game genre, etc.

As an example, this embodiment assumes the case where the game-running control unit 112 runs a third-person-viewpoint shooting game (TPS: third person shooter) in which various movable objects having three-dimensional shapes appear in a virtual space that is a virtual three-dimensional space constructed in a prescribed global coordinate system.

In this game, the movable objects individually have local coordinate systems set therefor, and the movable objects are disposed in the virtual space with the coordinates in the individual local coordinate systems converted into the coordinates in the global coordinate system.

In the following description, objects other than a movable object that is operable by the player will be referred to as "first objects". In order to move the first objects, the game-running control unit 112 changes the coordinates thereof in the local coordinate systems on the basis of a prescribed algorithm. Accordingly, the changed coordinates in the local coordinate systems are converted into coordinates in the global coordinate system, whereby movement of the first objects in the virtual space is realized.

Furthermore, the movable object that is operable by the player will be referred to as a "second object". In order to move the second object, the game-running control unit 112 changes the coordinates thereof in the local coordinate system on the basis of a movement instructing operation for the second object by the player. Accordingly, the changed coordinates in the local coordinate system are converted into coordinates in the global coordinate system, whereby movement of the second object in the virtual space is realized.

Furthermore, in order to realize a third person viewpoint, the game-running control unit 112 disposes a virtual camera in the virtual space, similarly to the movable objects. For example, in order to realize a viewpoint of looking down the second object from behind and above the head thereof, the game-running control unit 112 disposes a virtual camera at a position corresponding to a position behind and above the head of the second object. The position at which the virtual camera is disposed is moved as the second object moves. That is, in order to move the virtual camera, the game-running control unit 112 changes the coordinates thereof in the local coordinate system on the basis of a movement instructing operation for the second object by the player. Accordingly, the changed coordinates in the local coordinate system are converted into coordinates in the global coordinate system, whereby movement of the virtual camera in the virtual space is realized.

Furthermore, the photographing direction of the virtual camera (i.e., the orientation of the virtual camera) in the virtual space is changed on the basis of composite operations by the player.

Furthermore, an image obtained by the virtual camera by performing photography in the photographing direction from the position at which the virtual camera is disposed and corresponding to a region corresponding to the angle of view of the virtual camera in the virtual space (hereinafter referred to as a "photographed region") is displayed on the touchscreen 16 by the output control unit 113, which will be described below.

The output control unit 113 executes control processing for generating an image corresponding to the status of progress of the game on the basis of the status of progress of the game as controlled by the game-running control unit 112, image data stored in the game-running-data storage unit 191, which will be described later, the disposed position and photographing direction of the virtual camera described above, and the coordinates of the individual movable objects in the global coordinate system, and for causing the touchscreen 16 to display the generated image. That is, the output control unit 113 also functions as a rendering unit that executes processing for rendering the virtual space, the individual movable objects, user interfaces, etc. as the game is run.

In addition, the output control unit 113 executes processing for generating music, sound effects, voice, etc. for the game from the status of progress of the game as controlled by the game-running control unit 112 and sound data stored in the game-running-data storage unit 191 and for causing the speaker connected to the output unit 18 to output the generated sound, etc.

The photographed-region moving unit 114 executes processing for moving the photographed region that is photographed by the virtual camera by changing the photographing direction of the virtual camera in the virtual space on the basis of a composite operation by the player. For this purpose, the photographed-region moving unit 114 monitors the content of player operations input from the operation detecting unit 111. Furthermore, when a composite operation is performed by the player, the photographed-region moving unit 114 outputs an instruction for changing the photographing direction of the virtual camera to the individual functional blocks. Here, the composite operation is a swipe operation, as described earlier. The photographed-region moving unit 114 outputs an instruction to the other functional blocks so that the photographing direction of the virtual camera will be changed to a direction corresponding to a change in the coordinates of the position touched in the second swipe state in the swipe operation.

Accordingly, the game-running control unit 112 changes the photographing direction of the virtual camera in the virtual space. Furthermore, accordingly, the output control unit 113 generates an image corresponding to the photographed region photographed on the basis of the changed photographing direction and causes the touchscreen 16 to display the image. Thus, movement of the photographed region that is photographed by the virtual camera is realized.

The object selecting unit 115 executes processing for selecting a first object on the basis of a composite operation by the player. For this purpose, the object selecting unit 115 monitors the content of player operations input from the operation detecting unit 111. Furthermore, when a composite operation is performed by the player, the object selecting unit 115 outputs an instruction to the other functional blocks so that a cursor for selecting the first object will be displayed in the first swipe state. Accordingly, the output control unit 113 generates an image corresponding to a cursor (e.g., an image of a black circle) and causes the touchscreen 16 to display the image. The image corresponding to the cursor is displayed at a prescribed position of the photographed region photographed by the virtual camera, in a superimposed manner on the image corresponding to the photographed region. For example, the image corresponding to the cursor is displayed at the central position of the photographed region in a superimposed manner on the image corresponding to the photographed region.

Furthermore, when the photographed region is moved as a result of processing by the photographed-region moving unit 114 or the first object moves in the second swipe state, whereby the first object is displayed at the prescribed position where the image corresponding to the cursor is displayed, the object selecting unit 115 outputs an instruction for selecting the first object to the individual functional blocks.

Accordingly, the game-running control unit 112 sets the first object in a selected state. Furthermore, the game-running control unit 112 determines the information to be displayed on the touchscreen 16 in relation to the selected first object (hereinafter referred to as "object information"). There is no limitation as to what kinds of information are to be displayed as object information.

For example, the game-running control unit 112 determines that information indicating an action executable on the selected first object by the second object is to be displayed as object information. The action executable by the second object may be a single fixed action, or may be actions different among individual items that the selected first object or the second object is equipped with, which may be defined arbitrarily by the game developer. Alternatively, the game-running control unit 112 determines that information indicating the status or the like of the selected first object is to be displayed as object information. For example, the game-running control unit 112 determines that information indicating the name of the first object and a parameter of the first object (e.g., the current hit points of the first object) is to be displayed as object information.

Accordingly, the output control unit 113 causes the touchscreen 16 to display the object information determined by the game-running control unit 112 as information to be displayed. The object information is displayed at a prescribed position of the photographed region photographed by the virtual camera, in a superimposed manner on the image corresponding to the photographed region. For example, the object information is displayed in the proximity of the position where the cursor is displayed, in a superimposed manner on the image corresponding to the photographed region. In this case, in order to let the player recognize that the first object is currently selected, for example, the output control unit 113 may change the cursor image to a different image (e.g., an image encompassing the first object).

The action executing unit 116 executes processing for causing the second object to execute an executable action on the basis of a composite operation by the player. For this purpose, the action executing unit 116 monitors the content of player operations input from the operation detecting unit 111. Furthermore, in the case where a composite operation is performed by the player and the third swipe state results in the state where the first object is selected, the action executing unit 116 outputs an instruction to the other functional blocks so that the second object will execute an executable action. Accordingly, the output control unit 113 causes the second object to execute an executable action. Accordingly, the photographed-region moving unit 114 generates an image corresponding to the action executed by the second object (e.g., an image indicating the motion of the second object performing the action, an image indicating the motion of the first object responding to the action, or an image indicating an effect associated with the action) and causes the touchscreen 16 to display the image.

Here, as described earlier, the action executable by the second object may be varied depending on the selected first object. For example, in the case where the selected first object is an enemy character, the action is an action performed on the enemy character, such as an attack with a sword, successive attacks with a sword, shooting with an arrow, successive shooting with arrows, an attack by means of magic, successive attacks by means of magic, defending with a shield, or hitting with a shield, which is different from simple movement of a game character. Alternatively, the action may be an action for setting in place (or getting equipped with) a sword, a bow and arrow, or a shield in order to perform an attack or the like on the enemy character. Note that these are merely examples, and for example, the action may be an action of talking to a character, acquiring an item, or the like in the case where the second object is a character, an item, or the like other than an enemy character.

The composite-operation realizing process is executed through cooperation among the individual functional blocks, as described above, which makes it possible to handle a single swipe operation as a composite operation. Thus, it is possible, with just a single swipe operation, to realize a plurality of processing steps that have conventionally been realized by a combination of three operations, such as a swipe operation and a plurality of tap operations, as described earlier.

The game-running-data storage unit 191 stores various kinds of data needed for the game-running control unit 112 to run the game. Examples of the various kinds of data for running the game include game software, which is a program for executing the game, as well as image data, music data, and sound data for generating game images and sound. Furthermore, in the case where at least a portion of characters and the background is displayed by using three-dimensional computer graphics in the game, as in this embodiment, the game-running-data storage unit 191 also stores polygon data, texture information, etc. for realizing presentation based on three-dimensional computer graphics.

The parameter storage unit 192 stores prescribed parameters, as described in the above description of the game-running control unit 112.

Note that although these various kinds of data for running the game may be stored only in the game-running-data storage unit 191 of the storage unit 19, the data may be read by the drive 21 from the removable medium 100, as appropriate. Alternatively, these various kinds of data may be transmitted to the information processing device 1, as appropriate, by way of communication via the communication unit 20 from a server device (not shown) or other information processing devices 1 (not shown). That is, these various kinds of data may be downloaded, as needed and as appropriate, when the game is installed or when the game is updated.

[Operation and Presentation Examples]

Figure 3:
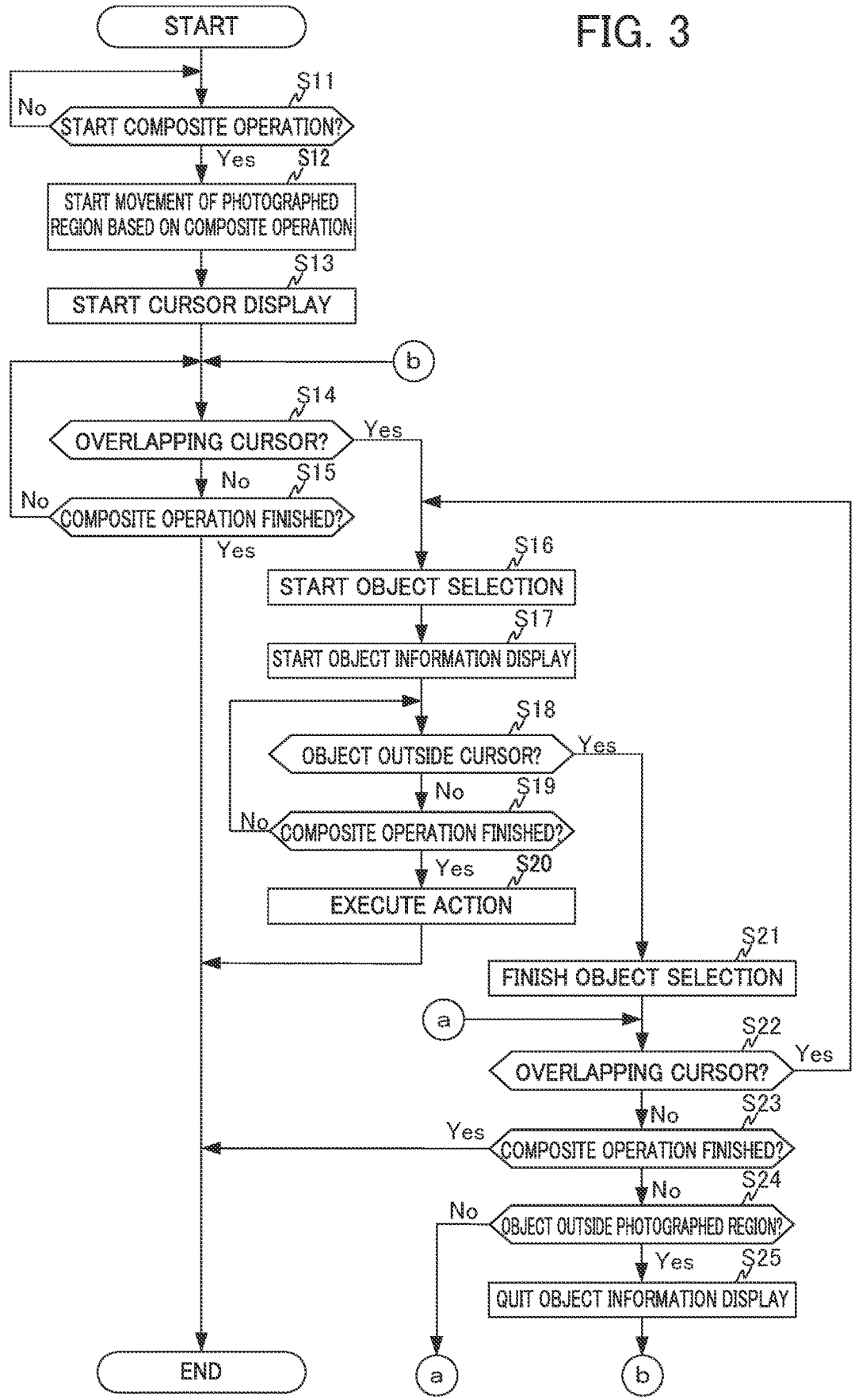
FIG. 3 is a flowchart showing the flow of the composite-operation realizing process, which is executed by the information processing device in FIG. 1 having the functional configuration in FIG. 2.

Next, the operation in the composite-operation realizing process that is executed by the information processing device 1 will be described with reference to FIG. 3. FIG. 3 is a flowchart for explaining the flow of the composite-operation realizing process. In addition, transitions among examples of presentation on the touchscreen 16, associated with the operation of the composite-operation realizing process, will be described with reference to FIGS. 4 to 7. FIGS. 4 to 7 are schematic illustrations showing transitions among examples of presentation on the touchscreen 16.

The composite-operation realizing process is executed in response to an operation for starting the game by the player. The individual functional blocks described above execute processing needed for executing the composite-operation realizing process, as appropriate, including processing that is not particularly mentioned in the following description with reference to the flowchart in FIG. 3.

In step S11, the object selecting unit 115 determines whether or not a composite operation by the player has been started. In the case where a composite operation by the player has been started, the determination in step S11 results in Yes, and the process proceeds to step S12. Meanwhile, in the case where a composite operation by the player has not been started, the determination in step S11 results in No, and the determination in step S11 is repeated in the process.

In step S12, the photographed-region moving unit 114 starts processing for moving the photographed region on the basis of the composite operation.

In step S13, the output control unit 113 starts processing for displaying a cursor for selecting a first object.

Figure 4:
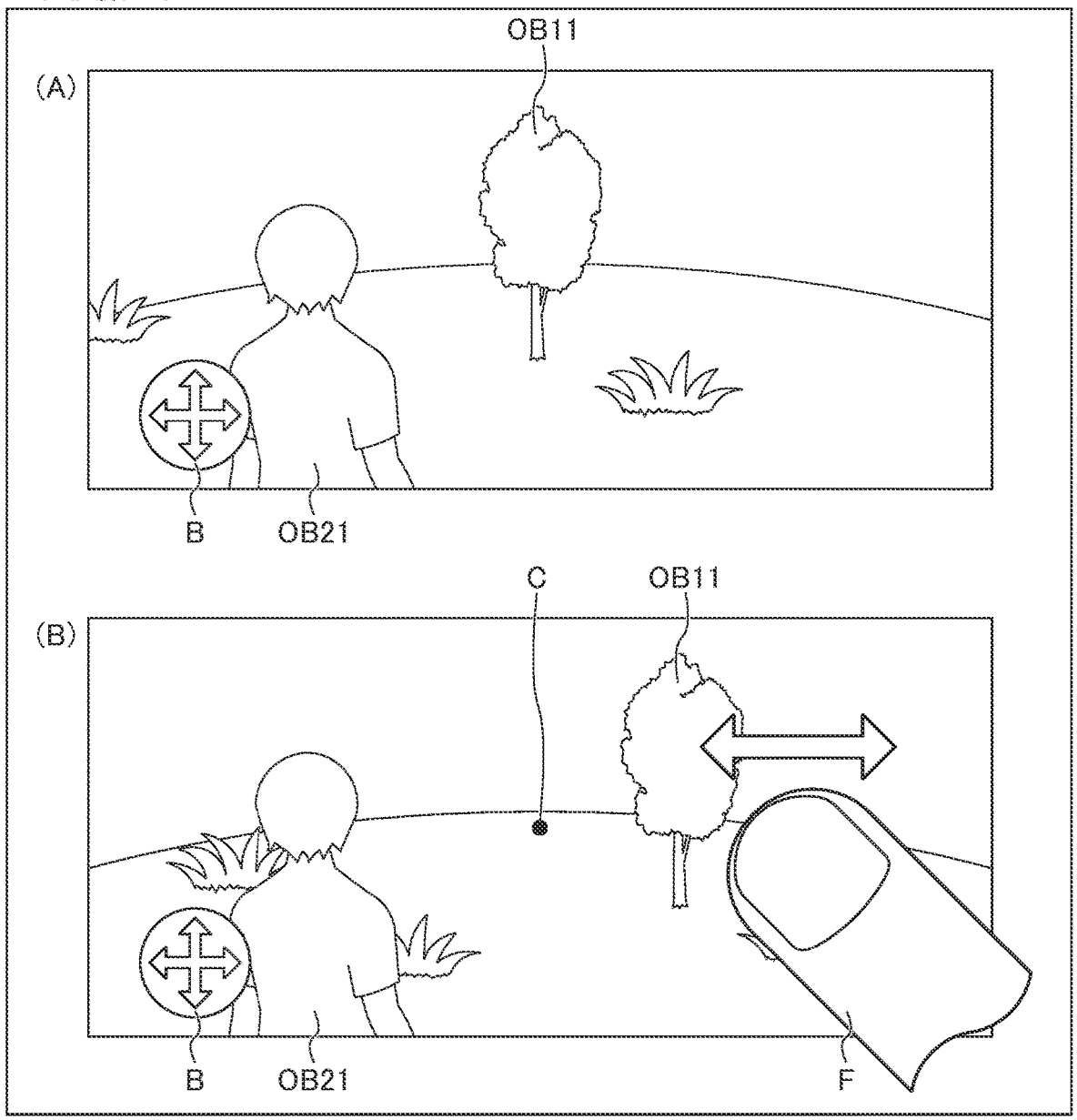
FIG. 4 is a schematic illustration showing an example of presentation of the positions of individual objects, etc. as an example of presentation in the composite-operation realizing process.

An example of presentation on the touchscreen 16 in this case will be described with reference to FIG. 4. First, at the timing before a composite operation is started (i.e., the timing when step S11 results in No), for example, presentation shown in part (A) in FIG. 4 is provided. That is, the virtual space, a first object OB11, and a second object OB21 are displayed as an image corresponding to the photographed region. Furthermore, a software button B simulating direction keys for accepting a movement instructing operation for the second object OB21 from the player is displayed at a prescribed position. In the case where the player has performed a touch operation on a position corresponding to a prescribed direction of the software button B, the operation detecting unit 111 determines that the content of the operation is a movement instructing operation in that prescribed direction. Then, the game-running control unit 112 moves the second object OB21 on the basis of the movement instructing operation. Note that, as described earlier, the position where the virtual camera is disposed is also moved as the second object OB21 is moved.

Furthermore, when the composite operation has been started and steps S12 and S13 have been executed, for example, presentation shown in part (B) in FIG. 4 is provided. That is, the photographed region is moved on the basis of the second swipe state in the composite operation performed with a finger of the player. Note that a finger F of the player and arrows are schematically shown in the figures in order to show how the displayed region is moved as the player executes a composite operation. Furthermore, a cursor image C is displayed at the central portion of the photographed region as an image corresponding to a cursor in addition to the presentation in part (A) in FIG. 4.

Referring back to FIG. 3., in step S14, the object selecting unit 115 determines whether or not the first object has been displayed at the prescribed position where the cursor image C is displayed as a result of movement of the photographed region or movement of the first object. In the case where the first object has been displayed at the prescribed position where the cursor image C is displayed, the determination in step S14 results in Yes, and the process proceeds to step S16. Meanwhile, in the case where the first object has not been displayed at the prescribed position where the cursor image C is displayed, the determination in step S14 results in No, and the process proceeds to step S15.

In step S15, the action executing unit 116 determines whether or not the composite operation has gone through the third swipe state and has been finished. In the case where the composite operation has gone through the third swipe state and has been finished, the determination in step S15 results in Yes, and the process is finished. Meanwhile, in the case where the second swipe state is maintained and the composite operation has not been finished, the determination in step S15 results in No, and the process returns to step S14 and is repeated from the determination in step S14.

In step S16, the object selecting unit 115 starts processing for selecting the first object displayed at the prescribed position where the cursor image C is displayed.

In step S17, the object selecting unit 115 starts processing for displaying object information corresponding to the first object displayed at the prescribed position where the cursor image C is displayed.

Figure 5:
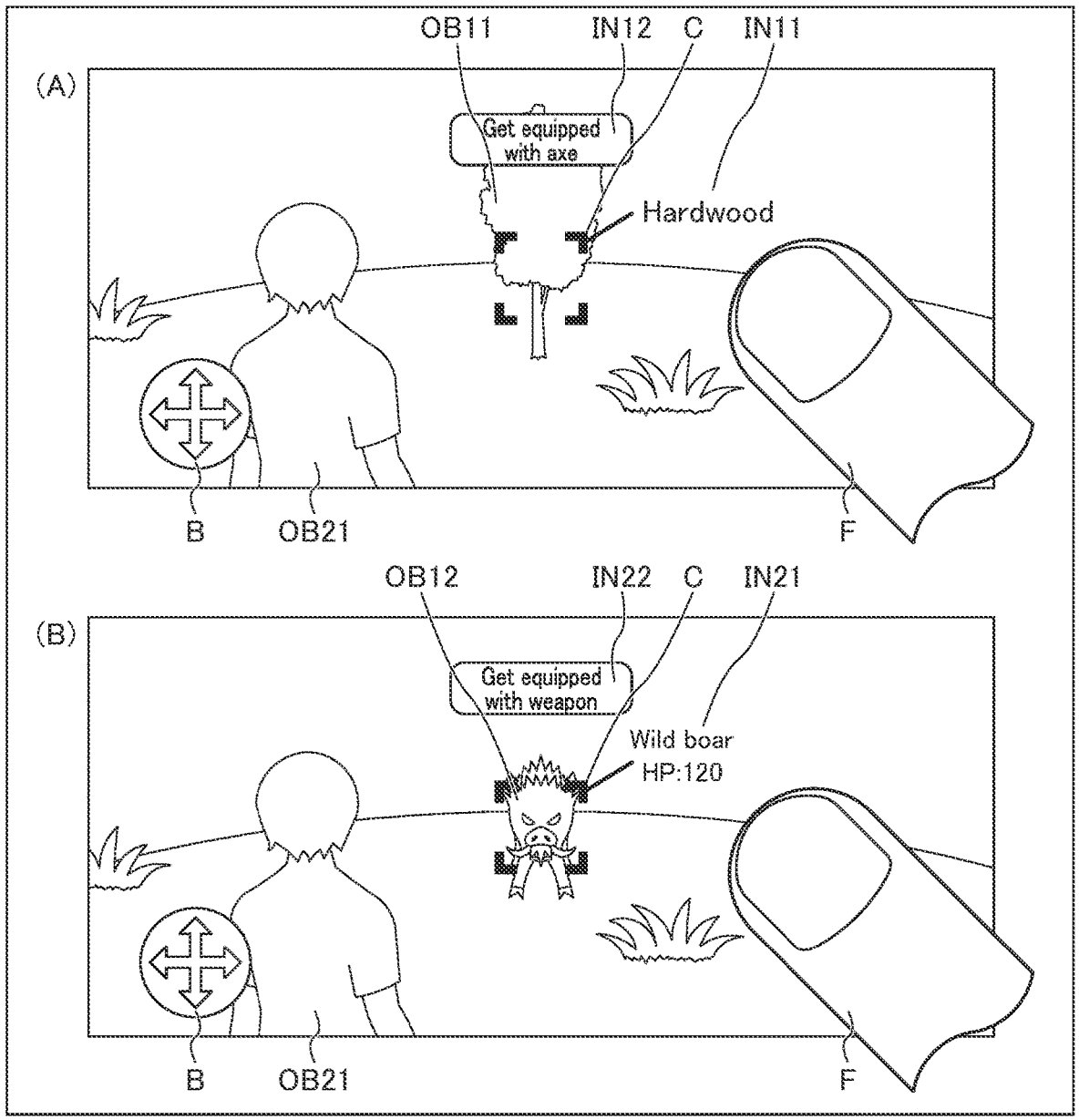
FIG. 5 is a schematic illustration showing an example of presentation of the selection of a first object, etc. as an example of presentation in the composite-operation realizing process.

An example of presentation on the touchscreen 16 in this case will be described with reference to FIG. 5. As a result of the execution of steps S16 and S17, for example, presentation shown in part (A) in FIG. 5 is provided. That is, in addition to the presentation in part (B) in FIG. 4, in order to let the player recognize that the first object OB11 is currently selected with the cursor image C, the cursor image C is changed to an image encompassing the first object OB11, and this image is displayed. Furthermore, object information IN11 and object information IN12 are displayed as object information. Here, the object information IN11 is information indicating the status, etc. of the first object OB11, and as an example, the text "hardwood" indicating the name of the first object OB11 is displayed in the figure. Furthermore, the object information IN12 is information indicating an action executable by the second object OB21 on the selected first object OB11, and as an example, the text "get equipped with axe", which is executable by the second object OB21, is displayed in the figure. This indicates that the second object OB21 can execute an action of getting equipped with an axe as a preparation for cutting down the first object OB11.

As another example, in the case where a first object OB12 is selected as another first object, presentation shown in part (B) in FIG. 5 is provided. That is, in order to let the player recognize that the first object OB12, not the first object OB11 in the presentation in part (A) in FIG. 5, is currently selected with the cursor image C, the cursor image C is changed to an image encompassing the first object OB12, and this image is displayed. Furthermore, object information IN21 and object information IN22 are displayed as object information. Here, the object information IN21 is information indicating the status, etc. of the first object OB12, and as an example, the text "wild boar" indicating the name of the first object OB12 as well as the text "HP: 120" indicating the current hit points of the first object OB12 are displayed in the figure. Furthermore, the object information IN22 is information indicating an action executable by the second object OB21 on the selected first object OB12, and as an example, the text "get equipped with weapon", which is executable by the second object OB21, is displayed in the figure. This indicates that the second object OB21 can execute an action of getting equipped with a weapon as a preparation for performing an attack on the first object OB12.

Referring back to FIG. 3, in step S18, the object selecting unit 115 determines whether or not, as a result of movement of the photographed region or a movement of the first object, the first object has been displayed outside the prescribed position where the cursor image C is displayed. In the case where the first object has been displayed outside the prescribed position where the cursor image C is displayed, the determination in step S18 results in Yes, and the process proceeds to step S20. Meanwhile, in the case where the first object is still displayed at the prescribed position where the cursor image C is displayed, the determination in step S18 results in No, and the process proceeds to step S19.

In step S19, the action executing unit 116 determines whether or not the composite operation has gone through the third swipe state and has been finished. In the case where the composite operation has gone through the third swipe state and has been finished, the determination in step S19 results in Yes, and the process proceeds to step S20. Meanwhile, in the case where the second swipe state is maintained and the composite operation has not been finished, the determination in step S19 results in No, and the process returns to step S18 and is repeated from the determination in step S18.

In step S20, the action executing unit 116 executes processing for causing the second object to execute the executable action. Then, the process comes to an end.

Figure 6:
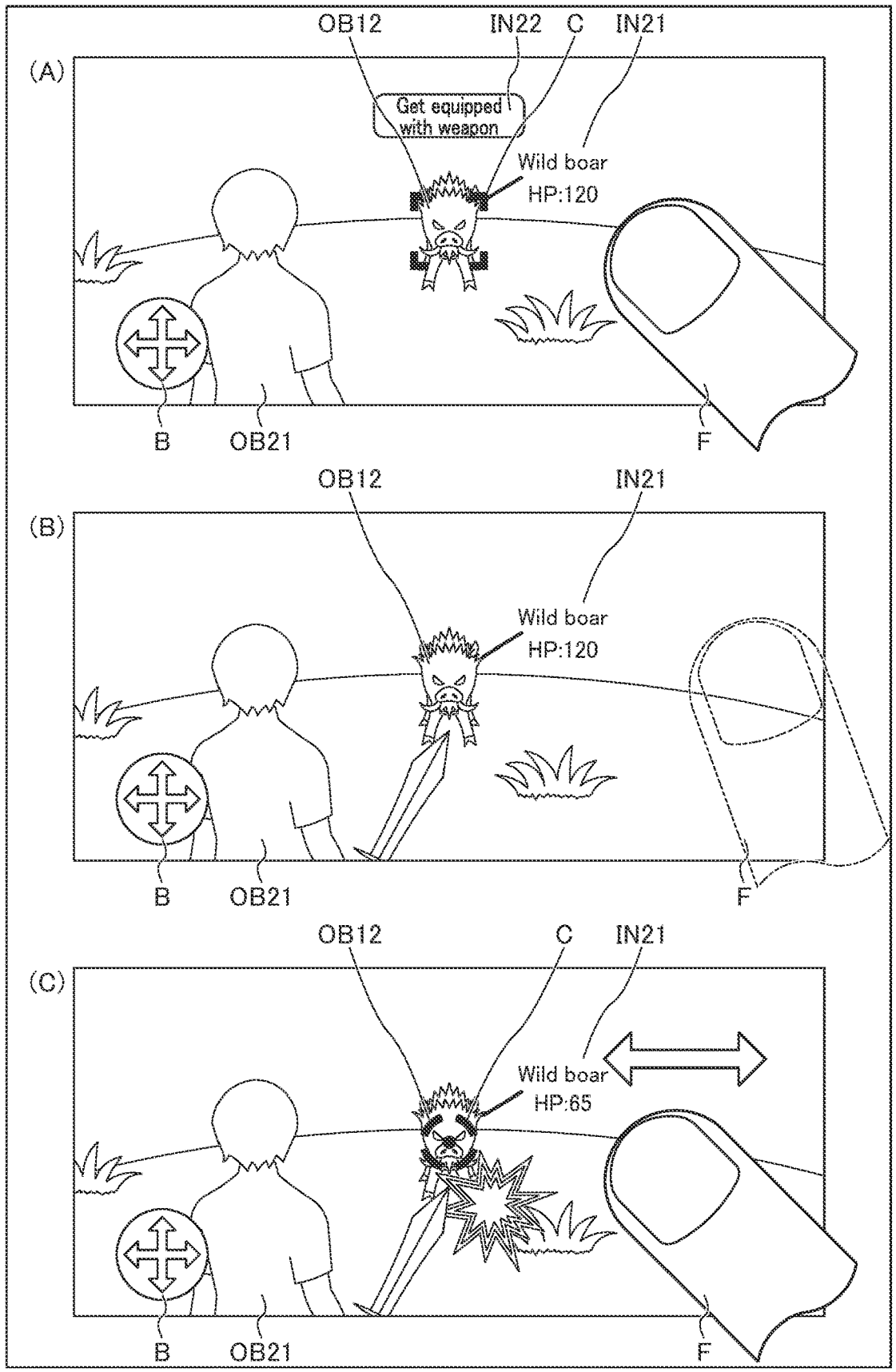
FIG. 6 is a schematic illustration showing an example of presentation of an action by a second object, etc. as an example of presentation in the composite-operation realizing process.

An example of presentation on the touchscreen 16 in this case will be described with reference to FIG. 6. Here, the presentation shown in part (A) in FIG. 6 is the same as the presentation shown in part (B) in FIG. 5. In this case, as a result of the execution of step S20, for example, presentation shown in part (B) in FIG. 6 is provided. That is, the displayed state of the second object OB21 is changed to a state in which the second object OB21 has been equipped with a weapon (a sword here). In the figure, the finger F of the player is schematically shown by a broken line in order to illustrate a state in which the composite operation has gone through the third swipe state and has been finished.

Furthermore, when the operation up to step S20 has been executed in a composite-operation realizing process that is newly executed later (i.e., when the first object OB12 has been selected again and the second object OB21 has been caused to execute an executable action), for example, as shown in FIG. 6 (cursor image C), an attack on the first object OB12 by means of the weapon that the second object OB21 is equipped with is executed, whereby the hit points of the first object OB12 are decreased.

As described above, just with a composite operation that is performed by the player, it is possible to realize processing such as displaying object information of a selected second object, getting equipped with a weapon corresponding to the selected second object, and the execution of an attack on the second object, as well as moving the photographed region corresponding to the displayed region. That is, it is possible to provide a player with simper operations in a computer game in which a displayed region is movable.

Referring back to FIG. 3, in step S21, the object selecting unit 115 finishes the processing for selecting a first object displayed at the prescribed position where the cursor image C is displayed. Then, the cursor image C is changed back to the black circle image from the image encompassing the first object. Meanwhile, a portion of the object information begun to be displayed in step S17 is displayed continuously.

In step S22, the object selecting unit 115 determines whether or not, a first object (which may be a first object that was once selected and whose object information is currently displayed or may be another first object) has been displayed again at the prescribed position where the cursor image C is displayed, as a result of movement of the photographed region or movement of the first object. In the case where a first object has been displayed again at the prescribed position where the cursor image C is displayed, the determination in step S22 results in Yes, and the process returns to step S16 and is repeated. Meanwhile, in the case where a first object has not been displayed again at the prescribed position where the cursor image C is displayed, the determination in step S22 results in No, and the process proceeds to step S23.

In step S23, the action executing unit 116 determines whether or not the composite operation has gone through the third swipe state and has been finished. In the case where the composite operation has gone through the third swipe state and has been finished, the determination in step S23 results in Yes, and the process is finished. Meanwhile, in the case where the second swipe state is maintained and the composite operation has not been finished, the determination in step S23 results in No, and the process proceeds to step S24.

In step S24, the object selecting unit 115 determines whether or not, as a result of movement of the photographed region or movement of the first object that was once selected and whose object information is currently displayed, the first object has come to be located outside the photographed region. In the case where the first object has come to be located outside the photographed region, the determination in step S24 results in Yes, and the process proceeds to step S25. Meanwhile, in the case where the first object is located inside the photographed region, the determination in step S24 results in No, and the process returns to step S22 and is repeated.

In step S25, the processing for displaying the currently displayed object information is finished. Then, the process returns to step S14 and is repeated.

An example of presentation on the touchscreen 16 in this case will be described with reference to FIG. 7. As shown in part (A) in FIG. 7, in this example, the case where the first object OB13 is selected in step S16 and object information IN31 and object information IN32 are displayed as object information in step S17 is assumed. Here, the object information IN31 is information indicating the status, etc. of the first object OB13, and as an example, the text "Mu-kun" indicating the name of the first object OB13 is displayed in the figure. Furthermore, the object information IN32 is information indicating an action executable by the second object OB21 on the selected first object OB13, and as an example, the text "talk", which is executable by the second object OB21, is displayed in the figure. This indicates that the second object OB21 can execute an action of talking to the first object OB13.

Figure 7:
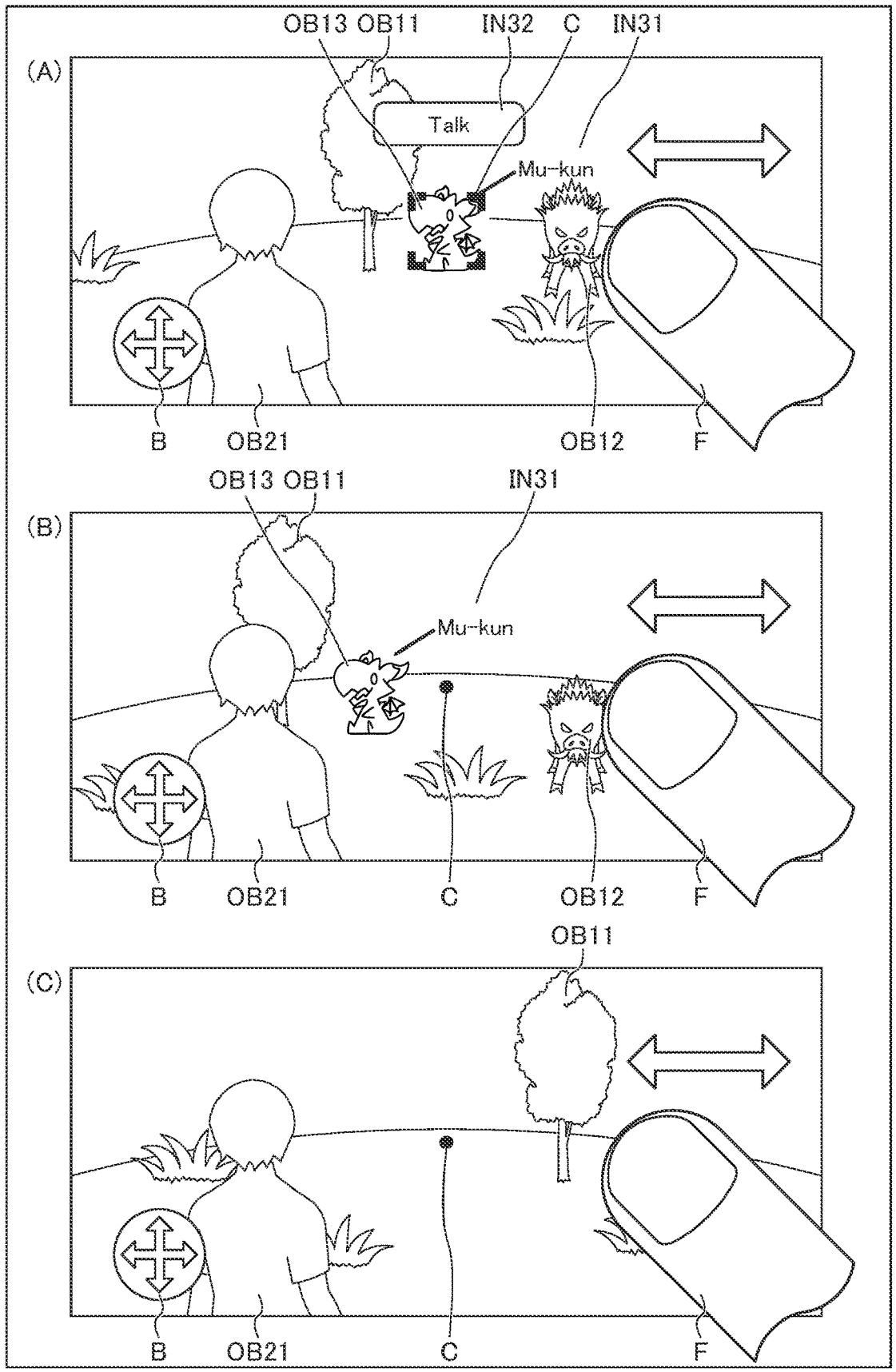
FIG. 7 is a schematic illustration showing an example of presentation of object information, etc. as an example of presentation in the composite-operation realizing process.

In this case, as a result of the execution of step S21, for example, presentation shown in part (B) in FIG. 7 is provided. That is, the cursor image C is changed back to the black circle image from the image encompassing the first object. Meanwhile, of the object information begun to be displayed in step S17, the object information IN31 is displayed continuously. Thus, the player can continue to refer to the object information IN31. However, since the first object OB13 is not in a selected state, the second object OB21 cannot execute an action of talking to the first object OB13. Thus, the presentation of the object information IN32 is quit.

In this case, when the first object OB13 has come to be located outside the photographed region and step S25 is further executed, the presentation of the object information IN31 is also quit. That is, the presentation of all the object information is quit. Thus, the presentation becomes the same as that in part (B) in FIG. 4, and it becomes possible to repeat the above-described process for a new first object.

[Modifications]

Although the embodiment of the present invention has been described above, the embodiment is merely an example and does not limit the technical scope of the present invention. The present invention can be embodied in various other forms, and it is possible to make various modifications, such as omission and substitution, without departing from the spirit of the present invention. These embodiments and modifications thereof are encompassed in the scope and spirit of the invention disclosed in this description, etc. and are encompassed in the scope of the invention recited in the claims and equivalents thereof.

For example, the embodiment of the present invention may be modified as in the following modifications. Furthermore, the following modifications may be combined with each other.

<First Modification>

In the embodiment described above, the object selecting unit 115 executes steps S16 and S17 in the case where it is determined in step S14 that, as a result of movement of the photographed region or movement of a first object, the first object has been displayed at the prescribed position where the cursor image C is displayed. That is, the object selecting unit 115 executes processing for selecting a first object and processing for displaying object information corresponding to the first object in the case where the first object is present in a range located in the photographing direction of the virtual camera and included in the photographed region. Without limitation to the embodiment, however, the processing may be executed in consideration of other criteria. For example, the processing may be executed also in consideration of the distance between the position of the virtual camera and the position of the first object.

For example, the process may be configured such that the determination in step S14 results in Yes and steps S16 and S17 are executed in the case where a first object has been displayed at the prescribed position where the cursor image C is displayed and the distance between the position of the virtual space and the position of the first object is within a prescribed distance.

Meanwhile, the process may be configured such that the determination in step S14 results in No and steps S16 and S17 are not executed in the case where a first object has been displayed at the prescribed position where the cursor image C is displayed and the distance between the position of the virtual camera and the position of the first object is not within the prescribed distance. Alternatively, as another modification, the process may be configured such that the determination in step S14 results in Yes but only either step S16 or S17 is executed in the case where a first object has been displayed at the prescribed position where the cursor image C is displayed and the distance between the position of the virtual camera and the first object is not within the prescribed distance. For example, the process may be configured such that although the processing for selecting a first object in step S16 is executed, the processing for displaying object information corresponding to the first object in step S17 is not executed.

This makes it possible to prevent executing steps S16 and S17 even for a first object that is located too remotely. For this purpose, the length of the prescribed distance for the determination should be, for example, a distance with which a sense of unnaturalness will not be perceived even when the second object executes an executable action. This makes it possible to prevent, for example, the second object from executing an attacking action with a sword on a first object that is located too remotely for the sword to reach.

Note that it is possible to calculate the distance between the position of the virtual camera and the position of the first object, which is used for performing the determination, from the difference between the coordinates of the virtual camera converted from coordinates in the local coordinate system into coordinates in the global coordinate system and the coordinates of the first object also converted from the coordinates in the local coordinate system into coordinates in the global coordinate system.

Furthermore, the modification described above may be further modified. For example, processing similar to the processing in the above-described modification may be executed on the basis of the distance between the position of the second object and the position of the first object instead of the distance between the position of the virtual camera and the position of the first object. Also in this case, an advantage is afforded in that it is possible to prevent the second object from executing an attacking action with a sword on a first object that is located too remotely for the sword to reach, as described above.

<Second Modification>

In the embodiment described above, a swipe operation on the touchscreen 16 by the player is handled as a composite operation, and a plurality of processing steps are executed on the basis of this single composite operation. Without limitation to the embodiment, however, other operations by the player may also be handled as composite operations. For example, operations for moving the photographed region other than a swipe operation, for which it is possible to identify the starts and ends, may be handled as composite operations.

For example, in the case of an operation utilizing an operation mechanism of the controller connected to the input unit 17, such as a cross key or an analog stick, processing is executed while considering that the first swipe state described earlier has been detected in the case where the start of an input via one of these operation mechanisms has been detected. Furthermore, while a movement operation in a prescribed direction via one of these operation mechanisms is continuously being detected, processing is executed while considering that the second swipe state described earlier has been detected. Furthermore, at the timing when the detection of the movement operation in the prescribed direction via one of these operation mechanisms has come to an end (or the timing when a prescribed time has elapsed since the end of the detection), processing is executed while considering that the third swipe state described earlier has been detected. Also in this case, it is possible to realize the composite-operation realizing process described above.

Alternatively, it is possible to realize the composite-operation realizing process described above even in the case of an operation in which a plurality of devices are used. For example, it is possible to realize the composite-operation realizing process described above even in the case where an operation for moving the second object, etc. is performed by using a keyboard or the like connected to the input unit 17 and an operation for moving the photographed region is performed by actually moving a pointing device (e.g., a mouse) connected to the input unit 17. In this case, processing is executed while considering that the first swipe state described earlier has been detected when movement of the pointing device has been started. Furthermore, while the movement in a prescribed direction by means of the pointing device is continuously being detected, processing is executed while considering that the second swipe state described above has been detected. Furthermore, at the timing when the detection of these movements in the prescribed direction by means of the pointing device has come to an end (or the timing when a prescribed time has elapsed since the end of the detection), processing is executed while considering that the third swipe state described earlier has been detected. Also in this case, it is possible to realize the composite-operation realizing process described above.

Furthermore, it is possible to realize the composite-operation realizing process described above also in the case of a controller that detects movement or tilting of the controller itself by the player is detected by means of an acceleration sensor or a gyro sensor. In this case, the detection of movement by means of the pointing device, described above, should be replaced with the detection of movement or tilting of the controller itself.

<Third Modification>

In the embodiment described above, it is assumed that there is only one action executable by the second object on the first object selected by the object selecting unit 115. Without limitation to the embodiment, however, there may be a plurality of actions executable by the second object. This case will be described with reference to FIG. 8.

FIG. 8 shows an example of presentation of object information, showing a situation similar to the situations in part (A) in FIG. 5, part (B) in FIG. 5, and part (A) in FIG. 7. As a result of the execution of steps S16 and S17, for example, presentation shown in FIG. 8 is provided.

That is, in addition to the presentation in part (B) in FIG. 4, in order to let the player recognize that a first object OB14 is currently selected with the cursor image C, the cursor image C is changed to an image encompassing the first object OB14, and this image is displayed. Furthermore, as object information, object information IN41, object information IN42, and object information IN43 are displayed. Here, the object information IN41 is information indicating the status, etc. of the first object OB14, and as an example, the text "fire" indicating the name of the first object OB14 is displayed in the figure. Furthermore, the object information IN42 and the object information IN43 are information individually indicating actions executable by the second object OB21 on the selected first object OB14. As an example, the text "warm up" and the text "cook", which are executable by the second object OB21, are displayed in the figure.

In this modification, as described above, there are a plurality of actions executable by the second object, and the individual actions are displayed as object information. Furthermore, when an operation for selecting one of these actions has been performed by the player, the second object is caused to execute the selected action. For example, after it is determined in step S23 that the composite operation has gone through the third swipe state and has been finished, the player performs a tap operation on the object information corresponding to an action to select. Then, the second object is caused to execute the selected action on the basis of the tap operation.

As described above, while realizing the composite-operation realizing process described above, it is possible to increase options for the player by enabling the execution of a plurality of actions.

Furthermore, as another modification, for example, in the case where there are a plurality of actions executable by the second object, one of the actions may be selected on the basis of the status of the second object. For example, one of the actions may be selected on the basis of the kind of weapon that the second object possesses (or is already equipped with). For example, in the case where the second object is equipped with a sword, as described with reference to part (B) in FIG. 6, an attack by means of the sword is selected as an action executable by the second object. Meanwhile, FIG. 9 shows another example of presentation in which, for example, the second object is equipped with a bow and arrow. In the case where the second object is equipped with a bow and arrow, as shown in FIG. 9, an attack by means of the bow and arrow is selected as an action executable by the second object. As described above, by selecting one of the actions on the basis of the kind of weapon that the second object possesses (or is already equipped with), it is possible to omit an operation for selecting an action, while realizing the composite-operation realizing process described above.

<Fourth Modification>

In the embodiment described above, it is assumed that the functional blocks for executing the composite-operation realizing process are realized with a single device, namely, the information processing device 1. Without limitation to the embodiment, however, the functional blocks for executing the composite-operation realizing process may be realized through cooperation among a plurality of devices. For example, the functional blocks for executing the composite-operation realizing process, realized with the information processing device 1, may be distributed to a server device, whereby the functional blocks are realized in the form of a client-server system. In this case, the server device may be a single server device or a combination of a plurality of server devices such as cloud servers.

Furthermore, the information processing device 1 and the server device carry out communication, as appropriate, to send and receive information, as appropriate. The information processing device 1 sends an operation accepted from the player via the touchscreen 16 thereof to the functional blocks of the server device. Furthermore, the functional blocks of the server device execute processing on the basis of the operation accepted from the player and received from the information processing device 1. Furthermore, the server device sends the result of this processing to the information processing device 1. Furthermore, the information processing device 1 displays an image based on the result of processing received from the server device on the touchscreen 16 thereof.

Also in this case, it is possible to realize the composite-operation realizing process described above.

<Fifth Modification>

The above-described embodiment has been described while assuming a game in which a single player participates. Without limitation to the embodiment, however, a multi-play game, in which a plurality of players participate, may be applied to the above-described embodiment. In this case, a plurality of second objects individually corresponding to the plurality of players are provided in a single virtual space, and the individual players operate the individual second objects. Furthermore, the composite-operation realizing process described above is executed in each of the operations of the individual second objects. In this case, the second object that is operated by a certain player may be handled as a first object for the other players.

<Sixth Modification>

In the embodiment described above, just with a composite operation that is performed by the player, it is possible to realize processing such as displaying object information of a selected first object, getting equipped with a weapon corresponding to the selected first object, and the execution of an attack on the first object, as well as moving the photographed region corresponding to the displayed region. Without limitation to the embodiment, however, these kinds of processing may be realized also in the case where the player has performed a separate operation other than a composite operation. That is, although operations for realizing certain processing may be limited to composite operations, the certain processing may be realized also with other operations.

For example, processing such as displaying object information of a selected first object, getting equipped with a weapon corresponding to the selected first object, and the execution of an attack on the first object may be realized in the case where an operation (e.g., a tap operation) other than a composite operation has been accepted via the touchscreen 16. Alternatively, these kinds of processing may be executed in the case where an operation has been accepted via one of the various buttons, direction keys, etc. included in the input unit 17.

<Other Modifications>

The embodiment of the present invention and some modifications have been described above. Note, however, that the present invention is not limited to the embodiment and some modifications described above and that the present invention encompasses modifications, improvements, etc. within a scope in which it is possible to achieve the object of the present invention.

Furthermore, the series of processing steps described above can be executed by hardware or by software.

In other words, the functional configuration shown in FIG. 2 is merely an example, and there is no particular limitation thereto. That is, it suffices to provide the information processing device 1 with functions that make it possible to execute the series of processing steps described above as a whole, and the choice of specific functional blocks for realizing those functions is not particularly limited to that in the example in FIG. 2.

Furthermore, each functional block may be implemented by hardware alone, by software alone, or by a combination of hardware and software.

The functional configuration in the embodiment is realized by using a processor that executes computational processing. Processors that can be used in the embodiment include a processor constituted of only one information processing device of various kinds, such as a single processor, a multiprocessor, or a multicore processor, as well as a combination of one of these various kinds of processing devices and a processing circuit such as an application specific integrated circuit (ASIC) or a field-programmable gate array (FPGA).

In the case where the series of processing steps is executed by software, a program constituting the software is installed in a computer or the like from a network or a recording medium.

The computer may be a computer embedded in special hardware. Alternatively, the computer may be a computer that is capable of executing various functions when various programs are installed therein, such as a general-purpose personal computer.

A recording medium including such a program is implemented by the removable medium 100 in FIG. 1, which is distributed separately from the main unit of a device in order to provide a player with the program, or is implemented by a recording medium or the like that is provided to a player in a state embedded in advance in the main unit of a device. The removable medium 100 is implemented, for example, by a magnetic disk (including a floppy disk), an optical disk, or a magneto-optical disk. The optical disk is implemented, for example, by a compact disk-read only memory (CD-ROM), a digital versatile disk (DVD), or a Blu-ray (registered trademark) disc. The magneto-optical disk is implemented, for example, by a mini-disk (MD). Furthermore, the recording medium that is provided to a player in a state embedded in advance in the main unit of a device is implemented, for example, by the ROM 12 in FIG. 1, in which the program is recorded, or a semiconductor memory included in the storage unit 19 in FIG. 1.

Note that, in this description, steps defining the program recorded in the recording medium may include processing that is not necessarily executed sequentially but is executed in parallel or individually, as well as processing that is executed sequentially in order. Furthermore, steps that are executed according to the program recorded in the recording medium may be executed in an arbitrary order within a scope not departing from the spirit of the present invention.

EXPLANATION OF REFERENCE NUMERALS

1 Information processing device
11 CPU
12 ROM
13 RAM
14 Bus
15 Input/output interface
16 Touchscreen
161 Display unit
162 Touch-operation accepting unit
17 Input unit
18 Output unit
19 Storage unit
20 Communication unit
21 Drive
100 Removable medium
111 Operation detecting unit
112 Game-running control unit
113 Output control unit
114 Photographed-region moving unit
115 Object selecting unit
116 Action executing unit
191 Game-running-data storage unit
192 Parameter storage unit

The invention claimed is:

1. A non-transitory computer readable medium storing an information processing program that, when executed by a computer, comprises:
 a disposing function for disposing a first object, a second object, and a virtual camera in a virtual space;
 an input function for receiving a plurality of inputs from a player to a touchscreen for performing a first continuous movement instructing operation,
 wherein the first continuous movement instructing operation is performed by a finger of the player moving between a first swipe state, a second swipe state, and a third swipe state,
 wherein the first swipe state corresponds to the finger being brought into contact or a prescribed proximity with the touchscreen,
 wherein the second swipe state corresponds to the finger being moved continuously while maintaining the contact or the prescribed proximity to the touchscreen, and
 wherein the third swipe state corresponds to the finger being moved away from the contact or the prescribed proximity of the touchscreen;
 a display control function for causing a display medium to:
  display, as a prescribed region, a region photographed by the virtual camera in a prescribed direction from a position that the virtual camera is disposed in the virtual space, and
  display a cursor with a first cursor image at a prescribed position in the prescribed region in response to performing the first swipe state of the first continuous movement instructing operation;
 a region moving function for moving the prescribed region by changing the prescribed direction being photographed by the virtual camera based on the second swipe state of the first continuous movement instructing operation;
 a selecting function for selecting the first object in response to the first object being displayed at the prescribed position where the cursor is displayed and the first swipe state of the first continuous movement instructing operation being continued to the second swipe state,
 wherein the first cursor image changes to a second cursor image that is different from the first cursor image in response to selecting the first object using the cursor, and wherein the second cursor image encompasses the first object; and
 an action executing function for causing the second object to execute an action executable on the first object that is selected while the first continuous movement instructing operation is continued in response to finishing the third swipe state of the first continuous movement instructing operation,
 wherein the display control function further causes the display medium to display object information in a superimposed manner in the region photographed by the virtual camera in response to selecting the first object using the cursor,
 wherein the object information indicates a status of the first object on the display medium.

2. The non-transitory computer readable medium storing the information processing program according to claim 1, the information processing program further comprising an object moving function for moving the position of the second object based on an input of a second continuous movement instructing operation for the second object, which is an operation different from the first continuous movement instructing operation,
 wherein the disposing function determines the position at which the virtual camera is disposed based on the position of the second object that has been moved by the object moving function.

3. The non-transitory computer readable medium storing the information processing program according to claim 1, wherein the first continuous movement instructing operation is accepted by means of an input accepting device stacked on the display medium.

4. The non-transitory computer readable medium storing the information processing program according to claim 1, wherein the display control function causes the prescribed position to:
   display the cursor in a first mode in response to starting the first continuous movement instructing operation, and
   display the cursor changing from the first mode to a second mode in response to selecting the first object by the selecting function.

5. The non-transitory computer readable medium storing the information processing program according to claim 1, wherein the action executing function determines a type of action executable on the first object selected while the first continuous movement instructing operation is being continued, depending on either or both of a type of the first object and a status of the second object.

6. The non-transitory computer readable medium storing the information processing program according to claim 1,
   wherein the action executing function causes the second object, action executable on the first object that was selected while the first continuous movement instructing operation is continued in response to finishing the first continuous movement instructing operation in response to determining a first case where there exists only one action executable on the first object that was selected while the first continuous movement instructing operation is being continued; and
   in response to a second case where there exists a plurality of actions executable on the first object that was selected while the first continuous movement instructing operation is continued,
   the display control function causes the prescribed region to display the plurality of actions as options in response to selecting the first object by the selecting function; and
   the action executing function determines, determines after finishing the first continuous movement instructing operation, an action to be executed by the second object based on an operation by the player for selecting an action from the options.

7. The non-transitory computer readable medium storing the information processing program according to claim 1, wherein the object information indicates a name of the first object.

8. The non-transitory computer readable medium storing the information processing program according to claim 1, wherein the object information indicates a current amount of hit points of the first object.

9. The non-transitory computer readable medium storing the information processing program according to claim 1, wherein the object information is displayed in proximity with the second cursor image.

10. An information processing method that is executed by a computer, the information processing method comprising:
    a disposing step of disposing a first object, a second object, and a virtual camera in a virtual space;
    an input step of receiving a plurality of inputs from a player to a touchscreen for performing a continuous movement instructing operation,
        wherein the continuous movement instructing operation is performed by a finger of the player moving between a first swipe state, a second swipe state, and a third swipe state,
        wherein the first swipe state corresponds to the finger being brought into contact or a prescribed proximity with the touchscreen,
        wherein the second swipe state corresponds to the finger being moved continuously while maintaining the contact or the prescribed proximity to the touchscreen, and
        wherein the third swipe state corresponds to the finger being moved away from the contact or the prescribed proximity of the touchscreen;
    a display control step of causing a display medium to:
        display, as a prescribed region, a region photographed by the virtual camera in a prescribed direction from a position where the virtual camera itself is disposed in the virtual space, and
        display a cursor with a first cursor image at a prescribed position in the prescribed region in response to— performing the first swipe state of the continuous movement instructing operation;
    a region moving step of moving the prescribed region by changing the prescribed direction being photographed by the virtual camera based on the second swipe state of the continuous movement instructing operation;
    a selecting step of selecting the first object in response to the first object being displayed at the prescribed position where the cursor is displayed and the first swipe state of the continuous movement instructing operation being continued to the second swipe state,
    wherein the first cursor image changes to a second cursor image that is different from the first cursor image in response to selecting the first object using the cursor, and wherein the second cursor image encompasses the first object; and
    an action executing step of causing the second object to execute an action executable on the first object that was selected while the continuous movement instructing operation is continued in response to finishing the third swipe state of the continuous movement instructing operation,
    wherein the display control step further causes the display medium to display object information in a superimposed manner in the region photographed by the virtual camera in response to selecting the first object using the cursor,
    wherein the object information indicates a status of the first object on the display medium.

11. An information processing device comprising:
    a touchscreen; and
    a processor coupled to a memory, wherein the memory comprises instructions configured to perform a method comprising:
    disposing a first object, a second object, and a virtual camera in a virtual space;
    receiving a plurality of inputs from a player to the touchscreen for performing a continuous movement instructing operation,
        wherein the continuous movement instructing operation is performed by a finger of the player moving between a first swipe state, a second swipe state, and a third swipe state,
        wherein the first swipe state corresponds to the finger being brought into contact or a prescribed proximity with the touchscreen,
        wherein the second swipe state corresponds to the finger being moved continuously while maintaining the contact or the prescribed proximity to the touchscreen, and wherein the third swipe state corresponds to the finger being moved away from the contact or the prescribed proximity of the touchscreen;

causing a display medium to:
 display, as a prescribed region, a region photographed by the virtual camera in a prescribed direction from a position where the virtual camera itself is disposed in the virtual space, and
 display a cursor with a first cursor image at a prescribed position in the prescribed region in response to— performing the first swipe state of the continuous movement instructing operation;

moving the prescribed region by changing the prescribed direction being photographed by the virtual camera based on the second swipe state of the continuous movement instructing operation;

selecting the first object in response to the first object being displayed at the prescribed position where the cursor is displayed and the first swipe state of the continuous movement instructing operation being continued to the second swipe state, wherein the first cursor image changes to a second cursor image that is different from the first cursor image in response to selecting the first object using the cursor, and wherein the second cursor image encompasses the first object; and causing the second object to execute an action executable on the first object that was selected while the continuous movement instructing operation is continued in response to finishing the third swipe state of the continuous movement instructing operation, wherein the display medium is further caused to display object information in a superimposed manner in the region photographed by the virtual camera in response to selecting the first object using the cursor, wherein the object information indicates a status of the first object on the display medium.

12. An information processing system comprising:
a terminal; and
a server communicatively connected to the terminal,
the terminal comprising:
 a display medium for performing display; and
 a touchscreen stacked on the display medium, and
the server comprising a processor and a memory coupled to the processor, wherein the memory comprises instructions configured to perform a method comprising:
disposing a first object, a second object, and a virtual camera in a virtual space;
receiving a plurality of inputs from a player to a touchscreen for performing a continuous movement instructing operation, wherein the continuous movement instructing operation is performed by a finger of the player moving between a first swipe state, a second swipe state, and a third swipe state, wherein the first swipe state corresponds to the finger being brought into contact or a prescribed proximity with the touchscreen, wherein the second swipe state corresponds to the finger being moved continuously while maintaining the contact or the prescribed proximity to the touchscreen, and wherein the third swipe state corresponds to the finger being moved away from the contact or the prescribed proximity of the touchscreen;

causing the display medium to:
 display, as a prescribed region, a region photographed by the virtual camera in a prescribed direction from a position where the virtual camera itself is disposed in the virtual space, and
 display a cursor with a first cursor image at a prescribed position in the prescribed region in response to performing the first swipe state of the continuous movement instructing operation;

moving the prescribed region by changing the prescribed direction being photographed by the virtual camera based on the second swipe state of the continuous movement instructing operation;

selecting the first object in response to the first object is displayed at the prescribed position where the cursor is displayed and the first swipe state of the continuous movement instructing operation being continued to the second swipe state, wherein the first cursor image changes to a second cursor image that is different from the first cursor image in response to selecting the first object using the cursor, and wherein the second cursor image encompasses the first object; and causing the second object to execute an action executable on the first object that was selected while the continuous movement instructing operation is continued in response to finishing the third swipe state of the continuous movement instructing operation, wherein the display medium is further caused to display object information in a superimposed manner in the region photographed by the virtual camera in response to selecting the first object using the cursor, wherein the object information indicates a status of the first object on the display medium.

* * * * *